Oct. 2, 1928.
W. D. KYLE
1,686,215
SECONDARY RACK
Filed July 27, 1923
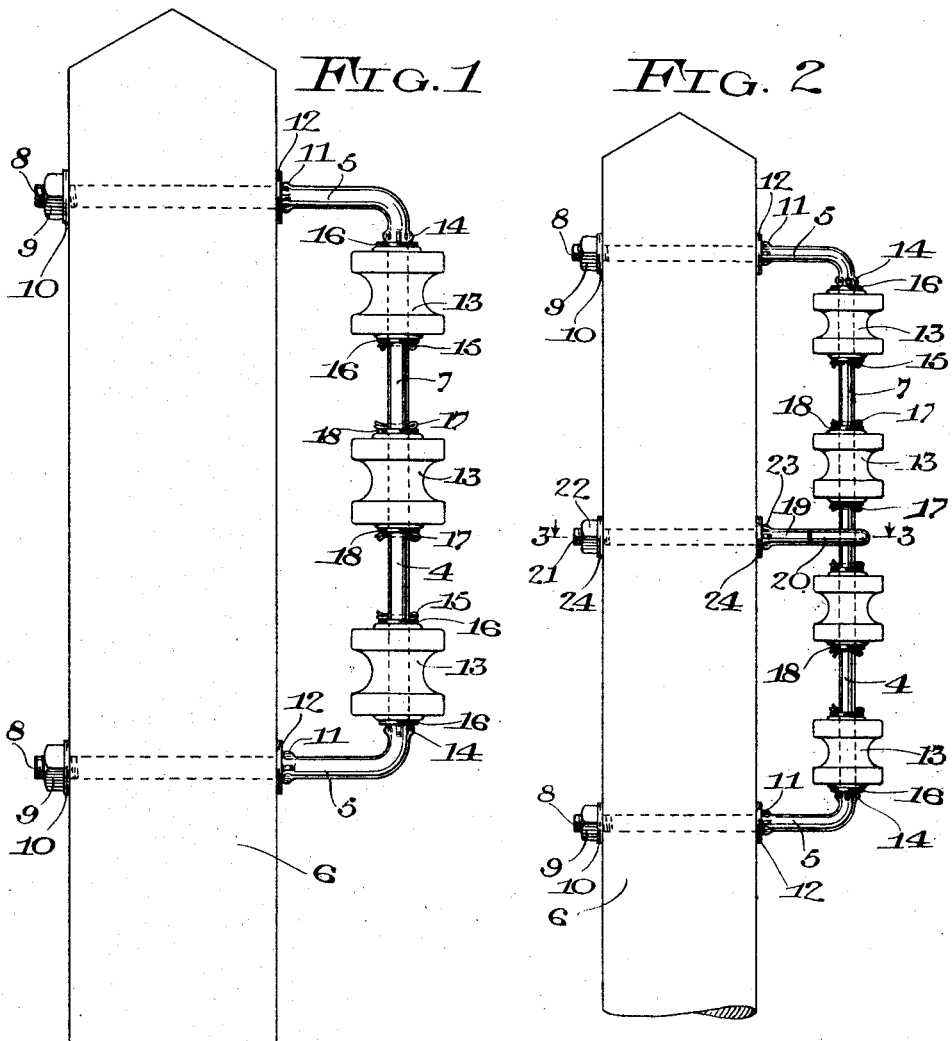

Patented Oct. 2, 1928.

1,686,215

UNITED STATES PATENT OFFICE.

WILLIAM D. KYLE, OF MILWAUKEE, WISCONSIN, ASSIGNOR TO LINE MATERIAL COMPANY, OF SOUTH MILWAUKEE, WISCONSIN, A CORPORATION OF WISCONSIN.

SECONDARY RACK.

Application filed July 27, 1923. Serial No. 654,157.

The invention relates to secondary racks.

The object of the invention is to provide a secondary rack, more particularly for use on line poles and other suitable supports, in which the usual base and separate insulator supporting arms or brackets are dispensed with, thereby reducing the number of parts that constitute the rack to a minimum and producing a rack at such a low cost that even if one or more of the insulators should break the whole rack may be discarded without much loss because of the low initial cost of the device compared with constructions now in use.

The invention further consists in the several features hereinafter set forth and more particularly defined by claims at the conclusion hereof.

In the drawings: Fig. 1 is an elevation of a rack embodying the invention; Fig. 2 is a view generally similar to Fig. 1 with the addition of a means for reinforcing the rack; and Fig. 3 is a detail sectional view taken on the line 3—3 of Fig. 2.

In the drawings the numeral 4 designates a U-shaped metal member conveniently formed from a round bar. The legs 5 of the member 4 are designed to extend through the pole 6. a cross-arm, or other suitable support, and to space the transverse portion 7 of the member 4 at the desired distance from the support. The ends 8 of the legs are threaded to take nuts 9 and the member is clamped to its support between a suitable shouldered portion or stop projection formed on each leg and the nut 9, which nut may engage against a washer 10 abutting against the support. The shouldered portion here shown consists of a plurality of ribs or projections 11 struck up from the rod which may engage against a washer 12. It will thus be noted that the end portions of the legs 5 of the member 4 are designed to form bolts to clamp the rack to its support.

The insulators 13 are placed on the member 4 prior to bending the end portions of said member into legs and they may be secured thereon against longitudinal displacement in any suitable manner. As shown the transverse portion of the member 4 has ribs 14 struck up therefrom near the legs to form stop projections, and those insulators nearest the legs are held between these projections and cotter pins 15 inserted in openings in the member 4, washers 16 being preferably provided between the ends of the insulator and the ribs 14 and pins 15. The intermediate insulator or insulators 13 may be held against longitudinal movement by cotter pins 17 inserted in openings in said member 4, and washers 18 may also be used between said pins and each insulator.

Where the span between the legs of the member is considerable so that there is a tendency for the transverse portion of the member 4 to bow when subjected to line strains, a reinforcing member 19 having an eyed or hooked portion 20 engaging the member 4 has its shank 21 passed through the support and is clamped thereto by a nut 22 on its threaded end and a shouldered portion formed by the struck up ribs 23, washers 24 being used, if desired. It will be noted that the insulators are slipped onto the member 4 before the legs are formed.

I desire it to be understood that this invention is not to be limited to any specific form or arrangement of parts except in so far as such limitations are specified in the claims.

What I claim as my invention is:

1. A secondary rack comprising a U-shaped member having integral leg portions each adapted to extend through a rack support and be clamped thereto, and insulators spacedly mounted on and receiving therethrough the transverse portion of said member and maintained against longitudinal displacement.

2. A secondary rack comprising a U-shaped member having integral leg portions each adapted to extend through a rack support, said leg portions having threaded nut-receiving ends and intermediately disposed shouldered portions cooperating therewith to clamp said member to its support and to space the transverse portion of said member from the support, and insulators mounted on and receiving therethrough the transverse portion of said member.

3. A secondary rack comprising a U-shaped member having leg portions each adapted to be clamped to a rack support, insulators mounted on the transverse portion of said member, and a hooked bolt member engaging said transverse portion at an intermediate point and having a threaded portion clamped to the support to reinforce said U-shaped member against bending strains.

4. A secondary rack comprising a U-shaped member having integral leg portions each adapted to be clamped to a rack support, insulators mounted on the transverse portion of said member, and a reinforcing member having a hooked part engaging said transverse portion at an intermediate point and a part adapted to extend through said support and be clamped thereto.

5. A secondary rack comprising a U-shaped rod having integral parallel bolt-ended leg portions for entrance into a support, and apertured insulators mounted on and receiving therethrough the transverse portion of said rod.

In testimony whereof I affix my signature.

WILLIAM D. KYLE.